FIG. 1.

INVENTORS
R.G. PIETY
R.S. MARSDEN, JR.
BY Hudson & Young
ATTORNEYS

FIG. 2.

INVENTORS
R. G. PIETY
R. S. MARSDEN, JR.
BY Hudson & Young
ATTORNEYS

FIG. 4.

INVENTORS
R. G. PIETY
R. S. MARSDEN, JR.
BY Hudson & Young
ATTORNEYS

FIG. 5.

INVENTORS
R.G. PIETY
R.S. MARSDENEN, JR.
BY Hudson & Young
ATTORNEYS

United States Patent Office 2,981,358
Patented Apr. 25, 1961

2,981,358
SIGNAL GENERATOR

Raymond G. Piety, Bartlesville, Okla., and Ross S. Marsden, Jr., Idaho Falls, Idaho, assignors to Phillips Petroleum Company, a corporation of Delaware Filed Nov. 16, 1955, Ser. No. 547,189

7 Claims. (Cl. 181—.5)

This invention relates to apparatus for generating electrical signals which vary in amplitude with respect to time in a predetermined manner. In another aspect it relates to apparatus to control the gain of seismic amplifiers.

In geophysical prospecting valuable information can often be obtained concerning subsurface formations by means of seismic surveys. A plurality of vibration responsive devices are positioned at or near the surface of the earth in a predetermined geometric array and an explosive charge is detonated at a region spaced therefrom. Vibrations emitted from the explosive travel downwardly into the earth and are reflected from various formations back to the vibration responsive elements. These vibration responsive elements generate electrical signals which are representative of the vibrations incident thereon. The signals are amplified and applied to a recording instrument. By observing the times of arrival of reflections at the various seismometers it is possible to obtain information regarding the depth and dip of subsurface formations.

In making records of this type it is often necessary to vary the gain of the amplifiers with respect to time because of large variations in signal amplitude between the beginning and end of the record. This can be accomplished by having the average signal level control the gain of the amplifier. However, if such an average gain control is applied to the first stages of the amplifier the gain is often controlled by low frequencies which are not produced by reflections and are later removed by filtering. This produces undesired fluctuations in the gain. If filters are placed before the automatic gain control to remove these low frequencies, the signal amplitude may become so large that it is difficult to design an input stage and filter which do not overload. This difficulty can be overcome by using a programmed gain control in which the gain of the amplifier is varied as a function of time. However, programmed gain controls employed heretofore have been decidedly limited in the manner by which the gain can be regulated. These control systems generally have been able to increase the gain only exponentially with respect to time.

In accordance with the present invention there is provided a novel function generator which is capable of providing a signal which varies in amplitude with respect to time in any desired manner. This is accomplished by using one or more glow transfer tubes having a plurality of cathodes. These tubes are designed so that the discharge can be moved progressively from one cathode to another. This movement is controlled by energizing the glow tube from a pulse generator of predetermined frequency. A potentiometer is connected to each cathode in the glow tube. The settings of these potentiometers are adjusted in accordance with the desired sequential amplitudes of the output signal. In this manner a signal is provided which varies in amplitude in the manner corresponding to the settings of the potentiometers. The resulting output signal can be employed to vary the gain of a seismic amplifier.

Accordingly, it is an object of this invention to provide apparatus to generate electrical signals which vary in amplitude with respect to time in a predetermined manner.

Another object is to provide apparatus to control the gain of amplifiers as a function of time.

Other objects, advantages and features of the invention should become apparent from the following detailed description taken in conjunction with the accompanying drawing in which.

Figure 1:
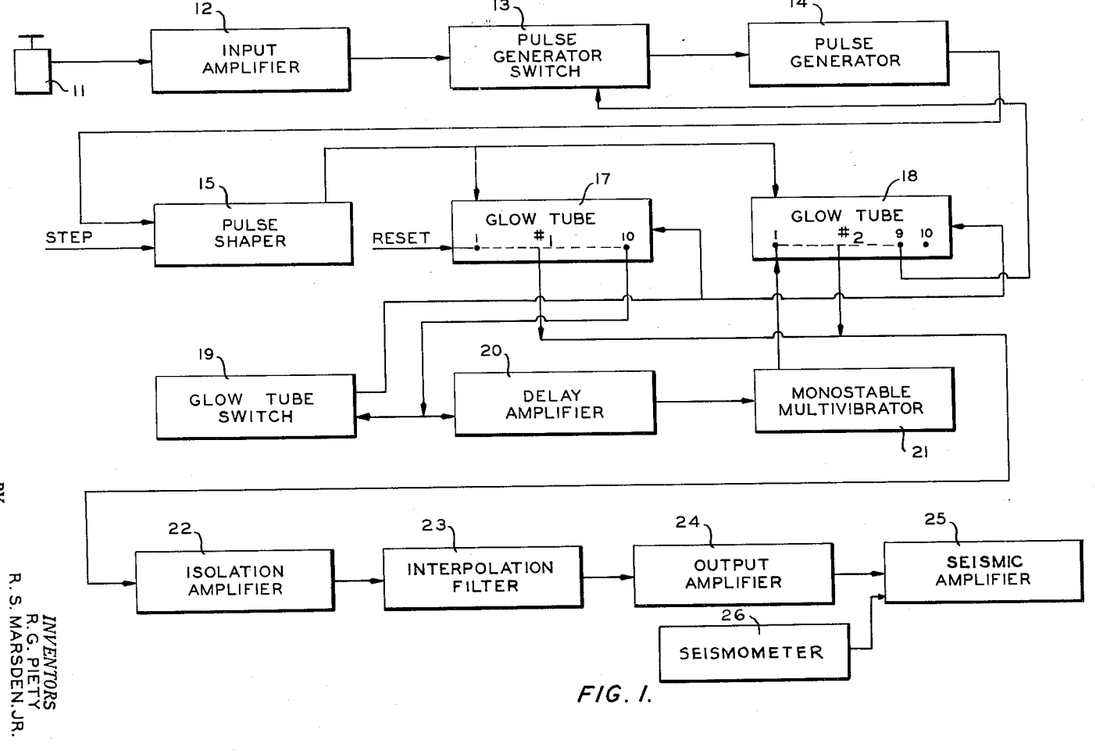
Figure 1 is a block diagram of a first embodiment of the apparatus of this invention.

Referring now to the drawing in detail and to Figure 1 in particular, there is shown a detonator 11 which can be employed to ignite an explosive charge to generate seismic waves. Detonator 11 also generates an electrical pulse which is applied to an input amplifier 12. The output of amplifier 12 is connected to the input of a pulse generator switch 13 which actuates a pulse generator 14. The output of pulse generator 14 is connected to the input of a pulse shaper 15 which provides a signal to transfer the discharge between adjacent cathodes of first and second glow transfer tubes 17 and 18. Glow tubes 17 and 18 are controlled by a glow tube switch 19 which regulates the plate voltage on the two tubes so that only one is active at a given time. The last cathode of glow tube 17 transmits a signal to a delay amplifier 20 which actuates a monostable multivibrator 21 to energize the first cathode of the second glow tube 18. The output signals from glow tubes 17 and 18 are applied to the input of an isolation amplifier 22. The output of amplifier 22 is applied through an interpolation filter 23 and an output amplifier 24 to control the gain of a seismic amplifier 25 the latter receiving the output signal from a seismometer 26.

Figure 2:
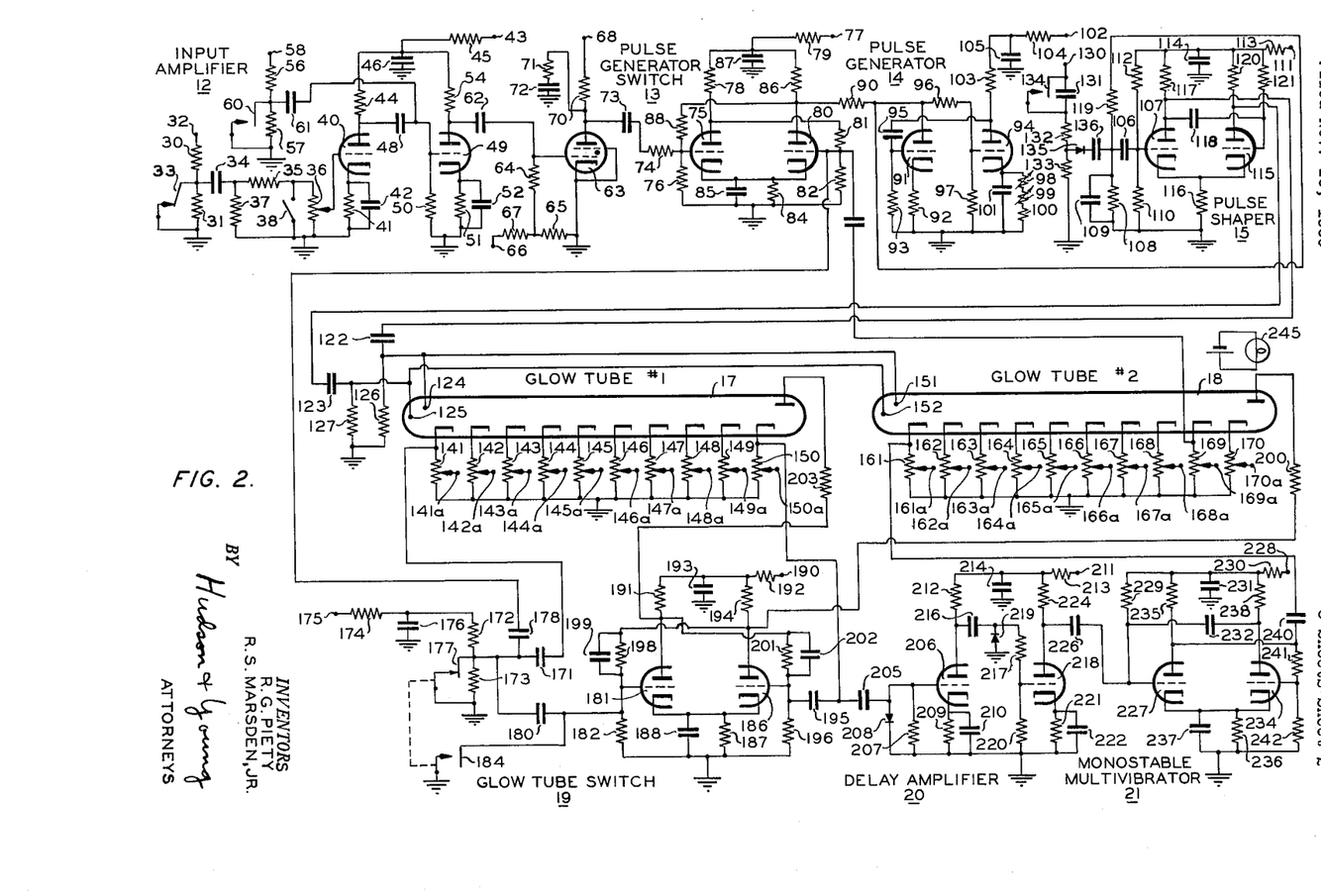
Figure 2 is a schematic circuit diagram of a portion of the apparatus of Figure 1.
Figure 3:
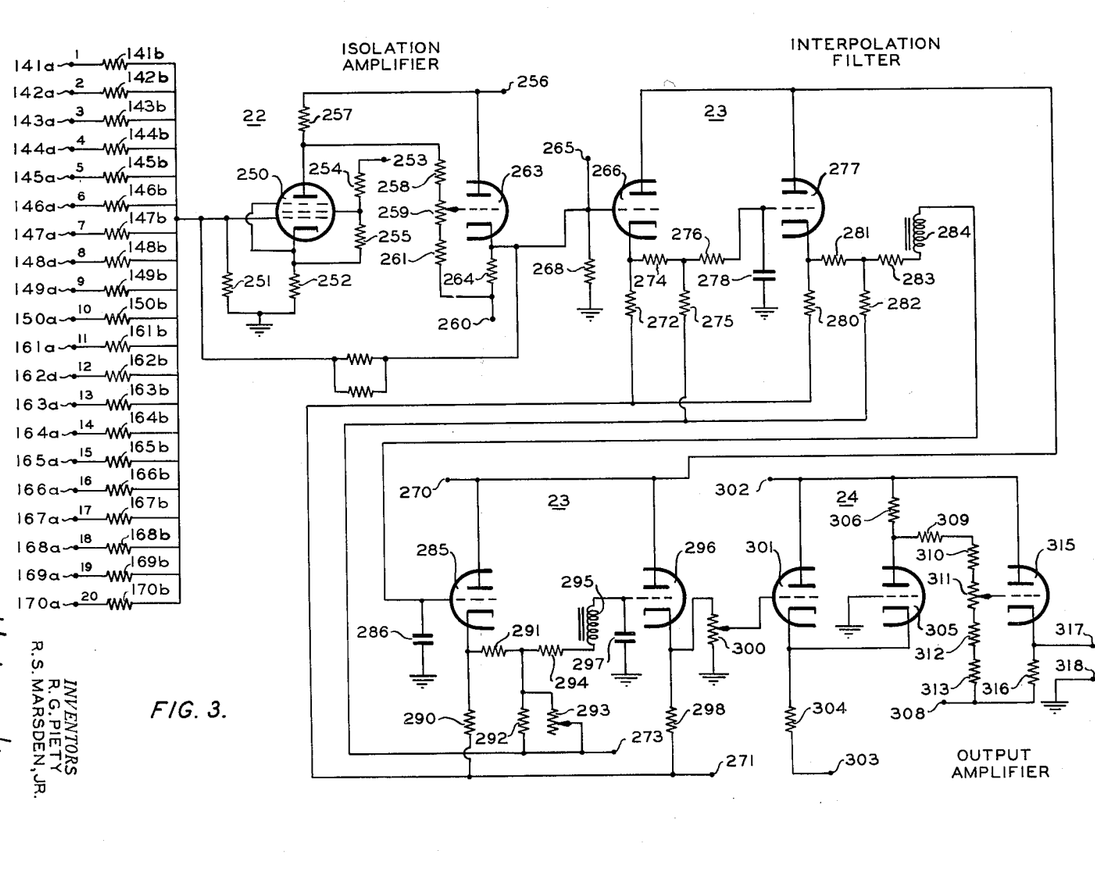
Figure 3 is a schematic circuit diagram of a second portion of the apparatus of Figure 1.

The apparatus of Figure 1 is illustrated in detail in Figures 2 and 3. First and second resistors 30 and 31 are connected in series between a positive potential terminal 32 and ground. A normally closed switch 33 is connected between ground and the junction between resistors 30 and 31. This junction is also connected through a capacitor 34 and a resistor 35 to the first end terminal of a potentiometer 36. The second end terminal of potentiometer 36 is connected to ground. A resistor 37 is connected between ground and the junction between capacitor 34 and resistor 35. A normally open switch 38 is connected in parallel with potentiometer 36. The contactor of potentiometer 36 is connected to the control grid of a triode 40 of amplifier 12. The cathode of triode 40 is connected to ground through a resistor 41 which is shunted by a capacitor 42. The anode of triode 40 is connected to a positive potential terminal 43 through resistors 44 and 45. A capacitor 46 is connected between ground and the junction between resistors 44 and 45. The anode of triode 40 is also connected through a capacitor 48 to the control grid of a triode 49. The control grid of triode 49 is connected to ground through a resistor 50. The cathode of triode 49 is connected to ground through a resistor 51 which is shunted by a capacitor 52. The anode of triode 49 is connected to terminal 43 through resistors 54 and 45.

Resistors 56 and 57 are connected in series between a positive potential terminal 58 and ground. A normally open switch 60 is connected in parallel with resistor 57. The junction between resistors 56 and 57 is connected through a capacitor 61 to the control grid of triode 49.

The anode of triode 49 is connected through a capacitor 62 to the control grid of a thyratron 63. The control grid of thyratron 63 is connected to ground through series connected resistors 64 and 65. The junction between resistors 64 and 65 is connected to a negative potential terminal 66 through a resistor 67. The cathode and a suppressor grid of thyratron 63 are connected directly to ground. The anode of thyratron 63 is connected to a positive potential terminal 68 through a resistor 70 and to ground through a resistor 71 and a capacitor 72.

The anode of thyratron 63 is connected through a capacitor 73 and a resistor 74 to the control grid of a triode 75 of pulse generator switch 13. The control grid of triode 75 is connected to ground through a resistor 76. The anode of triode 75 is connected to a positive potential terminal 77 through resistors 78 and 79. The anode of triode 75 is also connected to the control grid of a triode 80 through a resistor 81. The control grid of triode 80 is connected to ground through a resistor 82. The cathode of triodes 75 and 80 are connected to one another and to ground through a resistor 84 which is shunted by a capacitor 85. The anode of triode 80 is connected to terminal 77 through resistors 86 and 79. The junction between these two resistors is connected to ground through a capacitor 87. The control grid of triode 75 is connected through a resistor 88 to the anode of triode 80.

The anode of triode 80 is connected through a resistor 90 to the anode of a triode 91 of pulse generator 14. The cathode of triode 91 is connected to ground through a resistor 92. The control grid of triode 91 is connected to ground through a resistor 93 and to the anode of a triode 94 through a capacitor 95. The anode of triode 91 is connected to the control grid of triode 94 through a resistor 96. The control grid of triode 94 is connected to ground through a resistor 97. The cathode of triode 94 is connected to ground through resistors 98, 99 and 100 which are shunted by a capacitor 101. The anode of triode 94 is connected to a positive potential terminal 102 through resistors 103 and 104. The junction between these resistors is connected to ground through a capacitor 105.

The anode of triode 91 is connected through a resistor 119 and a capacitor 106 to the control grid of a triode 107 of pulse shaper 15. The junction between resistor 119 and capacitor 106 is connected to ground through a resistor 108 which is shunted by a capacitor 109. The control grid of triode 107 is connected to ground through a resistor 110 and to a positive potential terminal 111 through resistors 112 and 113. The junction between these resistors is connected to ground through a capacitor 114. The cathode of triode 107 is connected to the cathode of a triode 115 and to ground through a resistor 116. The anode of triode 107 is connected to potential terminal 111 through resistors 117 and 113. The anode of triode 107 is also connected through a capacitor 118 to the control grid of triode 115. The anode of triode 115 is connected to terminal 111 through resistors 120 and 113. The anodes of triodes 107 and 115 are connected through respective capacitors 122 and 123 to respective electrodes 124 and 125 of glow transfer tube 17. These electrodes serve to transfer the discharge between adjacent cathodes to a common anode. Electrodes 124 and 125 are connected to ground through respective resistors 126 and 127.

A positive potential terminal 130 is connected through a capacitor 131 and resistors 132 and 133 to ground. A normally open switch 134 is connected in parallel with capacitor 131. The junction between resistors 132 and 133 is connected through a rectifier 135 and a capacitor 136 to the junction between resistors 119 and 108. This apparatus provides manual stepping of the glow discharge in the manner described hereinafter.

Glow transfer tube 17 can be type GS10C manufactured by Atomic Instrument Company of Cambridge, Massachusetts. These tubes have 10 cathodes arranged in a circle. A discharge can exist between any one of the cathodes and the single anode. Guide electrodes 124 and 125 permit input pulses to transfer the glow from one cathode to an adjacent cathode. The glow transfers from the last cathode back to the first and continues around the circle. The ten cathodes of tube 17 are connected to ground through respective potentiometers 141–150. Electrodes 124 and 125 are connected to corresponding electrodes 151 and 152 in the second glow transfer tube 18. The ten cathodes of the second tube are connected to ground through respective potentiometers 161–170.

The first cathode of tube 17 is connected through a capacitor 171 to the junction between resistors 172 and 173. The second terminal of resistors 173 is connected to ground and the second terminal of resistor 172 is connected through a resistor 174 to a positive potential terminal 175. The junction between resistors 172 and 174 is connected through a capacitor 176 to ground. A normally closed switch 177 is connected in parallel with resistor 173. The junction between resistors 172 and 173 is connected through a capacitor 178 to the control grid of triode 80 in switch 13. This junction is also connected through a capacitor 180 to the control grid of a triode 181 of glow tube switch 19. The control grid of triode 181 is connected to ground through both a resistor 182 and a normally open switch 184. Switch 184 is mechanically connected to switch 177 so that switch 177 is opened when switch 184 is closed. These two switches are referred to hereinafter as the reset switches. The cathode of triode 181 is connected to the cathode of a triode 186 and to ground through a resistor 187 which is shunted by a capacitor 188. The anode of triode 181 is connected to a positive potential terminal 190 through resistors 191 and 192. The junction between these resistors is connected to ground through a capacitor 193. The anode of triode 186 is connected to terminal 190 through resistors 194 and 192. The tenth cathode of tube 17 is connected through a capacitor 195 to the control grid of triode 186. The control grid of triode 186 is connected to ground through a resistor 196. The control grid of triode 186 is connected through a resistor 201 which is shunted by a capacitor 202 to the anode of triode 181, which is connected to the first terminal of a resistor 203. The second terminal of resistor 203 is connected to the anode of glow transfer tube 17. The control grid of triode 181 is connected through a resistor 198 which is shunted by a capacitor 199 to the anode of triode 186, which is connected to the first terminal of a resistor 200. The second terminal of resistor 200 is connected to the anode of glow transfer tube 18.

The tenth cathode of tube 17 is also connected through a capacitor 205 to the control grid of a triode 206 of delay amplifier 20. The control grid of triode 206 is connected to ground through a resistor 207 which is shunted by a rectifier 208. The cathode of triode 206 is connected to ground through a resistor 209 which is shunted by a capacitor 210. The anode of triode 206 is connected to a positive potential terminal 211 through resistors 212 and 213. The junction between these resistors is connected to ground through a capacitor 214. The anode of triode 206 is also connected through a capacitor 216 and a resistor 217 to the control grid of a triode 218. The junction between capacitor 216 and resistor 217 is connected to ground through a rectifier 219. The control grid of triode 218 is connected to ground through a resistor 220. The cathode of triode 218 is connected to ground through a resistor 221 which is shunted by a capacitor 222. The anode of triode 218 is connected to terminal 211 through resistor 224 and 213.

The anode of triode 218 is connected through a capacitor 226 to the control grid of a triode 227 of monostable multivibrator 21. The control grid of triode 227 is connected to a positive potential terminal 228 through resistors 229 and 230. The junction between these resistors is connected to ground through a capacitor 231. The control grid of triode 227 is connected through a capacitor 232 to the anode of a triode 234. The anode of triode 227 is connected to terminal 228 through resistors 235 and 230. The cathodes of triodes 227 and 234 are connected to one another and to ground through a resistor 236 which is shunted by a capacitor 237. The anode of triode 234 is connected to terminal 228 through resistors 238 and 230. The anode of triode 227 is connected through a capacitor 240 to the first cathode of glow transfer tube 18. The anode of triode 227 is also connected through a resistor 241 to the control grid of triode 234. The control grid of triode 234 is connected to ground through a resistor 242.

The apparatus thus far described is actuated by switch 33 being opened momentarily. When the apparatus is utilized to control the gain of a seismic amplifier this switch can be opened at the time the explosive charge is detonated. The opening of switch 33 results in a positive pulse being applied to the control grid of triode 40. This pulse is amplified by triodes 40 and 49 and applied to the control grid of thyratron 63. The output pulse from thyratron 63 is of an amplitude and shape which is independent of the starting pulse. If desired, a starting pulse can be obtained by monentarily closing switch 60. This results in a negative pulse being applied to the control grid of triode 49. Switch 38 should be closed at this time to prevent extraneous pulses being applied to triode 40 from switch 33. The thyratron anode circuit preferably is adjusted so that the thyratron remains inoperative for several seconds after firing and then automatically resets. This prevents spurious pulses in the input circuit from causing erratic operation.

The output pulse from thyratron 63 is applied to switch 13 which is a bistable multivibrator. This multivibrator controls the anode voltage of triode 94 of pulse generator 14. The multivibrator is flipped "on" by the output pulse from thyratron 63 so that pulse generator 14 commences to oscillate. The frequency of oscillations of generator 14 is determined by the resistance in the cathode circuit of triode 94. This oscillator is of substantially the form described in Time Bases, Puckle, John Wiley, New York, pages 37–41 (1951). Switch 13 can be turned "off" by the reset switch 184 in the manner described hereinafter.

The output pulses from generator 14 are applied to pulse shaper circuit 15. Each positive input pulse applied to shaper 15 results in a pair of output pulses being to the guide electrodes of tubes 17 and 18.

It can be seen that the two glow transfer tubes are connected in parallel, with respect to the guide electrodes, so that the glows tend to move synchronously around each tube. However, switch 19 controls the anode voltage on the two glow tubes so that only one tube can be energized at a time. Glow tube switch 19 is a bistable multivibrator. When reset switches 184 and 177 are actuated, the control grid of triode 181 is grounded so that the potential on the anode thereof is a maximum to energize glow transfer tube 17. At the same time, a negative pulse is applied by switch 177 to the first cathode of tube 17 so that the discharge is between the first cathode of tube 17 and the anode thereof. The output pulses from shaper 15 result in the discharge transferring to successive cathodes. When the glow leaves the tenth cathode a negative pulse is applied to the control grid of triode 186. This results in switch 19 being flipped so that a positive bias potential is applied to the anode of tube 18.

The arrival of the discharge at the tenth cathode of tube 17 results in a positive pulse being tpplied to the input of delay amplifier 20. The output pulse from the delay amplifier triggers monostable multivibrator 21. The output of this circuit is differentiated by capacitor 240 to form a large negative pulse which is applied to the first cathode of glow transfer tube 18. In order to reduce the time required for glow transfer tube 18 to become energized after the pulse generator switch is triggered, a light 245 is directed on the tube.

Thus, at the beginning of the operation the glow is on the first cathode of tube 17 and remains at this position for an indefinite period. An input pulse to the system results in this glow transferring along the cathodes of the two tubes at time intervals determined by the frequency of pulse generator 14. When the glow leaves the next to the last cathode of tube 18 a negative pulse is applied directly to the control grid of triode 80 which turns "off" switch 13. The glow thus stops on the last cathode of tube 18 and remains at this position.

The sequential amplitude values of the desired output signal are established by the settings of the contactors of potentiometers 141–150 and 161–170. The contactors of these potentiometers are connected to respective output terminals 141a, 141b ... 150a and 161a, 162a ... 170a. These terminals are connected through respective isolating resistors 141b, 142b ... 150b and 161b, 162b ... 170b to the control grid of a pentode 250 of isolation amplifier 22 which is illustrated in detail in Figure 3. The control grid of pentode 250 is connected to ground through a resistor 251. The cathode and suppressor grid of pentode 250 are connected to ground through a resistor 252. The screen grid of pentode 250 is connected to a positive potential terminal 253 through a resistor 254. The screen grid of pentode 250 is connected to the cathode thereof through a resistor 255. The anode of pentode 250 is connected to a positive potential terminal 256 through a resistor 257. The anode of pentode 250 is also connected through a resistor 258 to one end terminal of a potentiometer 259. The second end terminal of potentiometer 259 is connected to a negative potential terminal 260 through a resistor 261. The contactor of potentiometer 259 is connected to the control grid of a triode 263. The anode of triode 263 is connected to terminal 256, and the cathode of triode 263 is connected to terminal 260 through a resistor 264. Parallel connected feedback resistors are connected between the cathode of triode 263 and the control grid of pentode 250. The cathode of triode 263 is connected to a first output terminal 265 and to the control grid of a triode 266 which forms a part of interpolation filter 23.

The control grid of triode 266 is connected to ground through a resistor 268. The anode of triode 266 is connected to a positive potential terminal 270. The cathode of triode 266 is connected to a negative potential terminal 271 through a resistor 272 and to a second negative potential terminal 273 through resistors 274 and 275. The junction between resistors 274 and 275 is connected through a resistor 276 to the control grid of a triode 277. The control grid of triode 277 is connected to ground through a capacitor 278. The anode of triode 277 is connected to terminal 270. The cathode of triode 277 is connected to terminal 271 through a resistor 280 and to terminal 273 through resistors 281 and 282. The junction between resistors 281 and 282 is connected through a resistor 283 and an inductor 284 to the control grid of a triode 285. The control grid of triode 285 is connected to ground through a capacitor 286. The anode of triode 285 is connected to terminal 270. The cathode of triode 285 is connected to terminal 271 through a resistor 290. The cathode of triode 285 is also connected to terminal 273 through resistors 291 and 292. A variable resistor 293 is connected in parallel with resistor 292. The junction between resistors 291 and 293 is connected through a resistor 294 and an inductor 295 to the control grid of a triode 296. A capacitor 297 is connected between the control grid of triode 296 and ground. The anode of triode 296 is connected to a positive potential terminal 270. The cathode of triode 296 is connected to terminal 271 through a resistor 298.

The cathode of triode 296 is also connected to the first end terminal of a potentiometer 300. The second end terminal of this potentiometer is connected to ground. The contactor of potentiometer 300 is connected to the control grid of a triode 301 of output amplifier 24. The anode of triode 301 is connected to a positive potential terminal 302. The cathode of triode 301 is connected to a negative potential terminal 303 through a directly to the cathode of triode 305. The control grid of triode 305 is connected to ground. The anode of triode 305 is connected to terminal 302 through a resistor 306. The anode of triode 306 is also connected to a negative potential terminal 308 through resistors 309 and 310, a potentiometer 311 and resistors 312 and 313. The contactor of potentiometer 311 is connected to the control grid of a triode 315. The anode of triode 315 is connected to terminal 302. The cathode of triode 315 is connected to terminal 308 through a resistor 316. The cathode of triode 315 is also connected to an output terminal 317. The second output terminal 318 is connected to ground.

The isolating resistors 141b, 142b ... 150b and 161b, 162b ... 170b are employed to make the adjustments of the potentiometers in the cathode circuits of the glow transfer tubes independent of one another. The voltages appearing at the contactors of each of the potentiometers are combined and amplified by amplifier 22. The stepped output voltage from amplifier 22 generally must be smoothed before it can be used to control the gain of the seismic amplifier. If such a smoothing is not necessary for a particular application, the output signal can be taken between terminal 265 and ground. The smoothing of the stepped output function is based upon a convolution of a rectangular step with an isosceles triangle. This convolution is performed by passing the stepped function through a filter having approximately a triangular impulse response. The illustrated filter comprises one RC network and two RCL networks. The individual networks are separated by cathode followers to make their parameters independent of each other. Considerable attenuation occurs in the interpolation filter so that the output amplifier 24 is employed to provide a signal capable of controlling the gain of a seismic amplifier, such as 25.

One of the main advantages of the function generator thus far described is the ease by which a function can be established on potentiometers. A voltmeter can be placed across output terminals 317 and 318. Potentiometer 141 is then adjusted until the desired value of the first step of the signal is obtained. Switch 134 is then closed to apply a positive pulse to pulse shaper 15. This transfers the discharge to the second cathode of tube 17. Potentiometer 142 is then adjusted until the output signal represents the desired second step of the signal. This procedure is continued to set the remaining potentiometers.

Figure 4:
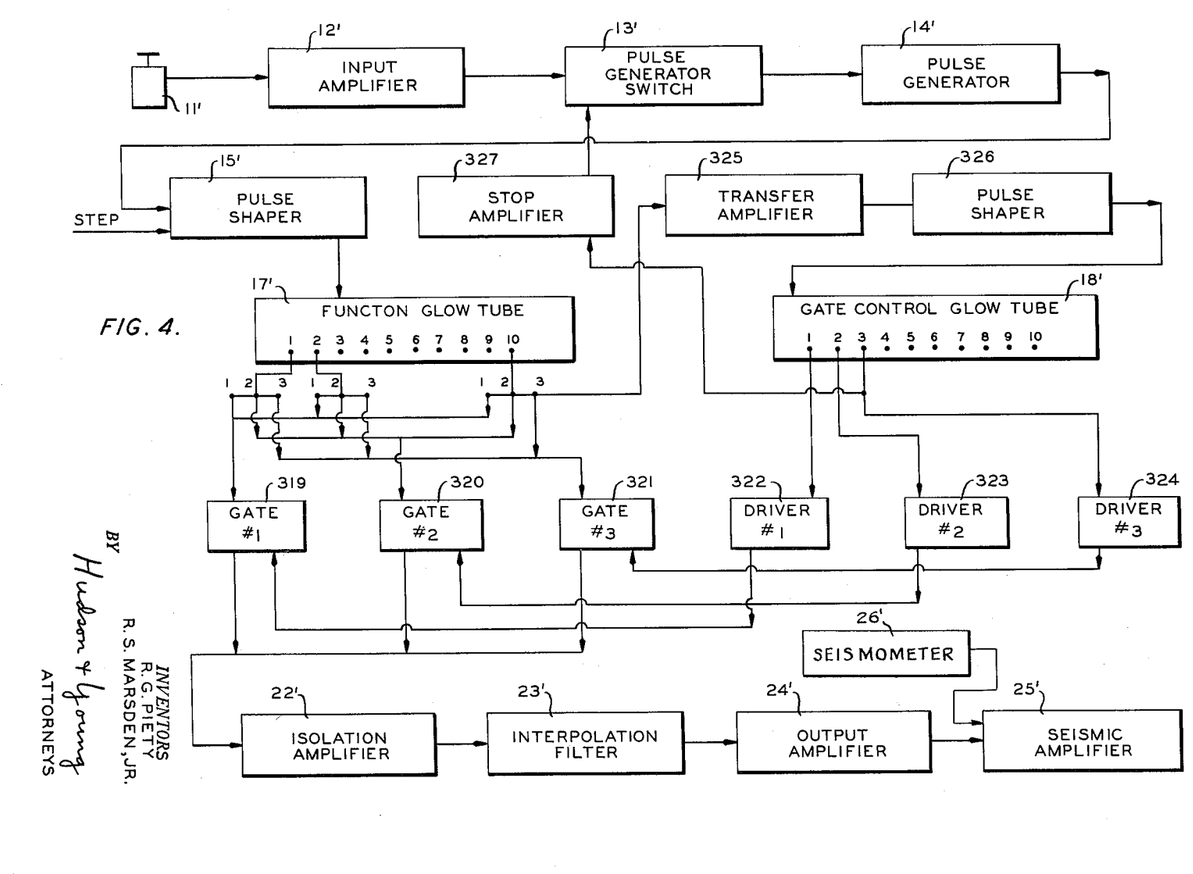
Figure 4 is a block diagram of a second embodiment of the apparatus of this invention.

In Figure 4 there is shown a second embodiment of the function generator which is adapted to provide a signal having a large number of selected values. The input pulse shaping portion of this function generator is identical to that illustrated in Figures 1 and 2 and corresponding elements are designated by like primed reference numerals. The output pulses from pulse shaper 15' are applied to a first function glow transfer tube 17' which corresponds to tube 17 of Figure 1. The output circuit of tube 17' differs from that of tube 17 in that a plurality of potentiometers is connected to each of the cathodes. In the illustrated embodiment three potentiometers are connected to each of the cathodes. Corresponding first potentiometers in each of these groups are connected through a first gate circuit 319 to the input of isolation amplifier 22'. Corresponding second potentiometers in each of the groups are connected through a second gate circuit 320 to the input of amplifier 22'. Corresponding third potentiometers in each of the groups are connected through a third gate circuit 320 to the input of amplifier 22'. These three gate circuits are actuated by respective driver circuits 322, 323 and 324 which in turn are controlled by a second glow transfer tube 18'. The last cathode of tube 17' supplies a pulse which is applied through a transfer amplifier 325 to actuate a second pulse shaper 326. The output pulses from shaper 326 control the discharge transfer along the cathodes of tube 18'. The third cathode of tube 18' also provides a pulse which turns off pulse generator switch 13' after being amplified by stop amplifier 327.

Figure 5:
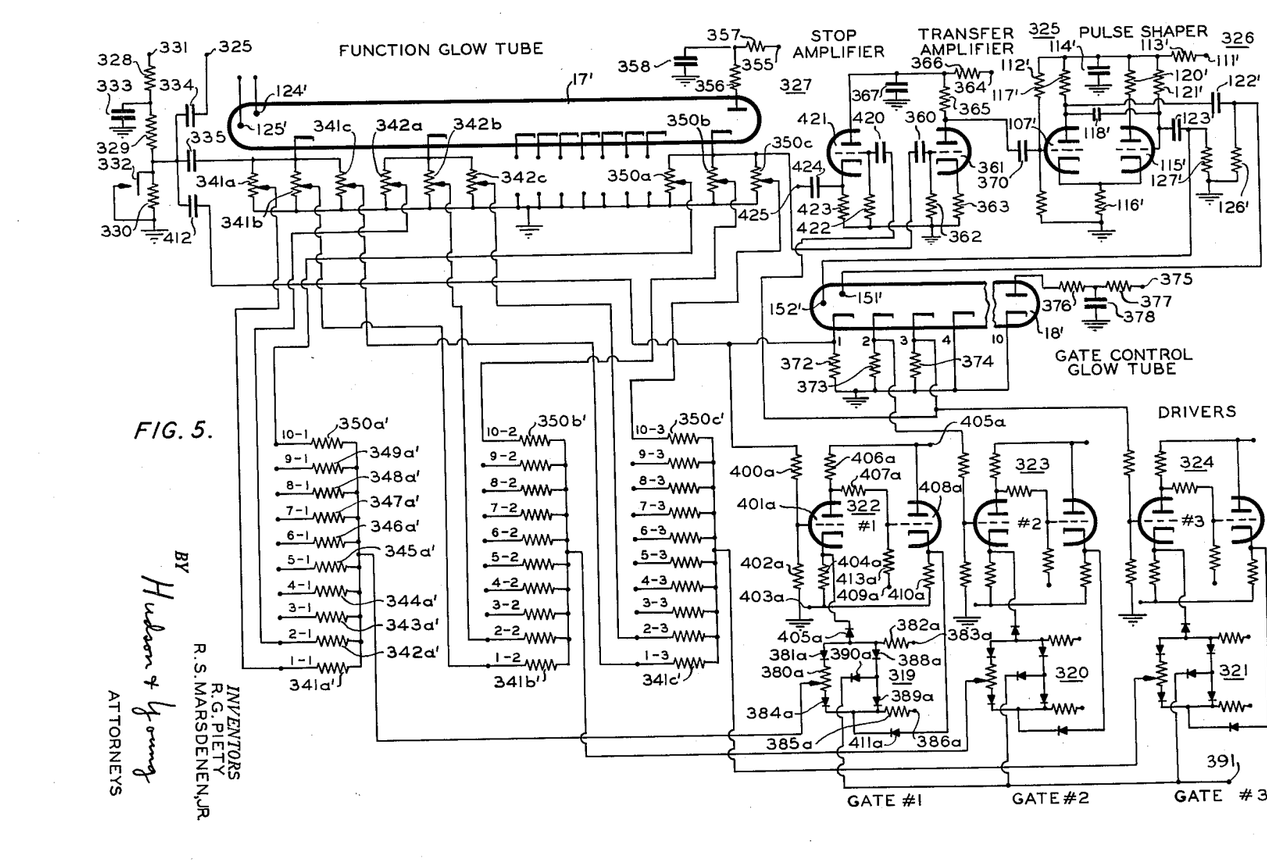
Figure 5 is a schematic circuit diagram of a portion of the apparatus of Figure 4.

The circuit of Figure 4 is illustrated schematically in Figure 5. The reset mechanism comprises resistors 328, 329 and 330 connected in series between a positive potential terminal 331 and ground. A normally closed reset switch 332 is connected in parallel with resistor 330. A capacitor 333 is connected between ground and the junction between resistors 328 and 329. The junction between resistors 329 and 330 is connected through a first capacitor 334 to an output terminal 325 which is connected to the control grid of triode 80 (see Figure 2) in pulse generator switch 13. The junction between resistors 329 and 330 is also connected through a capacitor 335 to the first cathode of tube 17'. Three potentiometers 341a, 341b and 341c are connected in parallel relationship with one another between the first cathode of tube 17' and ground. Corresponding potentiometers are connected between each of the other nine cathodes and ground. Guide electrodes 124' and 125' are actuated by the output pulses of pulse shaper 15. The anode of tube 17' is connected to a positive potential terminal 355 through resistors 356 and 357. The junction between these resistors is connected to ground through a capacitor 358.

The tenth cathode of tube 17' is connected through a capacitor 360 to the control grid of a triode 361 which forms transfer amplifier 325. The control grid of triode 361 is connected to ground through a resistor 362. The cathode of triode 361 is connected to ground through a resistor 363. The anode of triode 361 is connected to a positive potential terminal 364 through resistors 365 and 366. The junction between these resistors is connected to ground through a capacitor 367.

The anode of triode 361 is connected through a capacitor 370 to the control grid of a triode 107' of pulse shaper 326. The circuit of pulse shaper 326 is identical to that of pulse shaper 15, illustrated in Figure 2, and corresponding elements are designated by like primed reference numerals. The two output terminals of pulse shaper circuit 326 are connected to the guide electrodes 151' and 152' of tube 18'.

The illustrated embodiment of the function generator of Figure 5 provides a signal having thirty set amplitude values. In this embodiment only the first three cathodes of tube 18' are needed. Resistors 372, 373 and 374 are connected between these respective cathodes and ground. The anode of tube 18' is connected to a positive potential terminal 375 through resistors 376 and 377. The junction between these resistors is connected to ground through a capacitor 378.

The contactors of corresponding first potentiometers in each group of potentiometers connected to the cathodes of tube 17' are connected to respective first terminals of isolating resistors 341a', 342a' ... 350a'. The second terminals of these resistors are connected to one another and to the contactor of a potentiometer 380a in gate circuit 319. The first end terminal of potentiometer 380a is connected through a rectifier 381a and a resistor 382a to a positive potential terminal 383a. The second end terminal of potentiometer 380a is connected through a rectifier 384a and a resistor 385a to a negative potential terminal 386a. The junction between rectifier 381a and resistor 382a is connected to the junction between rectifier 384a and resistor 385a through series connected rectifiers 388a and 389a. The junction between these last two rectifiers is connected through a rectifier 390a to an output terminal 391.

The first cathode of glow transfer tube 18' is connected through a resistor 400a to the control grid of a triode 401a in driver circuit 322. The control grid of triode 401a is connected to ground through a resistor 402a. The cathode of triode 401a is connected to a negative potential terminal 403a through a resistor 404a. The cathode of triode 401a is also connected through a rectifier 405a to the junction between rectifiers 381a and 388a. The anode of triode 401a is connected to a positive potential terminal 405a through a resistor 406a. The anode of triode 401a is also connected through a resistor 407a to the control grid of a triode 408a. The control grid of triode 408a is connected to a negative potential terminal 409a through a resistor 413a. The anode of triode 408a is connected to terminal 405a, and the cathode of triode 408a is connected to terminal 403a through a resistor 410a. The cathode of triode 408a is also connected through a rectifier 411a to the junction between rectifiers 384a and 389a. The first cathode of tube 18' is also connected through a capacitor 412 to the junction between resistors 329 and 330 of the reset circuit.

Output terminal 391 is connected to the control grid of pentode 250 in isolation amplifier 22' of the form illustrated in Figure 3.

The corresponding second and third potentiometers which are connected to each of the cathodes of tube 17' are connected through corresponding isolating resistors to respective gate circuits 320 and 321. These circuits and their corresponding driver circuits are identical to the circuits thus far described. The gate circuits are of the type described by Millman and Puckett in Proc. I.R.E., 43, 29–37 (1955).

When the glow discharges leaves the third cathode of tube 18', a pulse is applied through a capacitor 420 to the control grid of a triode 421 of amplifier 327. The cathode of triode 421 is grounded through a resistor 423, and the anode of triode 421 is connected to terminal 364. The cathode of triode 421 is connected through a capacitor 424 to a terminal 425 which is connected to the control grid of triode 80 in the pulse generator switch, see Figure 2. This turns the pulse generator "off."

The thirty sequential desired output signals are set on respective potentiometers 341a', ... 350a', 341b', ... 350b', 341c', ... 350c'. Tube 18' fires at the same time tube 17' fires initially so that Gate No. 1 remains open as the discharge transfers down the ten cathodes of tube 17'. When the discharge reaches the tenth cathode of tube 17' a pulse is applied to the guide electrodes of tube 17' through pulse shaper 326. This transfers the glow to the second cathode of tube 18' to open Gate No. 2. The glow repeats the transfer down the ten cathodes of tube 17'. At the end of the second transfer the discharge in tube 18' moves to the third cathode to open Gate No. 3. The transfer again repeats in tube 17'.

The function generator shown in Figures 4 and 5 provides thirty selected output voltages. It should be evident that this can readily be extended to one hundred points by utilizing all ten cathodes in tube 18' and connecting ten potentiometers to each of the cathodes of tube 17'.

From the foregoing description of two preferred embodiments of this invention, it should be apparent that there is provided an improved signal generator which is particularly useful to control the gain of a seismic amplifier. Any arbitrary electrical signal can be generated by setting sequential values on the potentiometers. While the invention has been described in conjunction with the present preferred embodiment, it should be evident that it is not limited thereto.

What is claimed is:

1. Electrical signal generating apparatus comprising a glow transfer tube having an anode, a plurality of cathodes, and guide electrode means; a plurality of potential dividing networks connected between each of said cathodes and a reference potential; means to apply a potential to the anode of said tube which is positive with respect to said reference potential; means to apply pulses at a predetermined rate to said guide means to transfer a discharge between adjacent cathodes and said anode; a plurality of gate circuits each having an output terminal; output circuit means connected to the output terminals of said gate circuits for generating output signals having a sequence of amplitudes proportional to the amplitudes of signals in the order they appear at said terminals; means to pick off predetermined portions of the potentials across said networks; means to apply the picked off potentials of corresponding networks connected to each of said cathodes to a respective one of said gate circuits; and means to open adjacent ones of said gate circuits at time intervals corresponding to the time the discharge moves past all the cathodes in said tube.

2. The combination in accordance with claim 1 wherein said last-mentioned means comprises a second glow transfer tube having an anode, a plurality of cathodes, and guide electrode means; means to apply a potential to the anode of said second tube which is more positive than said reference potential; means responsive to a discharge being at a selected cathode of said first-mentioned tube to generate a second pulse; means to apply said second pulse to the guide means of said second tube; and means to open a corresponding gate circuit responsive to a discharge at respective ones of the cathodes of said second tube.

3. The combination in accordance with claim 1 further comprising filter means to smooth the output signal provided by said means for generating voltages.

4. The apparatus in accordance with claim 3 wherein said filter means comprises a first cathode follower, a resistance-capacitance filter having the input thereof connected to the output of said first cathode follower, a second cathode follower having the input thereof connected to the output of said filter, a first resistance-inductance-capacitance filter having the input thereof connected to the output of said second cathode follower, a third cathode follower having the input thereof connected to the output of said first filter, a second resistance-inductance-capacitance filter having the input thereof connected to the output of said third cathode follower, and a fourth cathode follower having the input thereof connected to the output of said second filter.

5. Apparatus for generating an electrical signal which varies in amplitude with respect to time in a predetermined manner comprising a glow transfer tube having an anode, a plurality of cathodes, and guide electrode means to transfer a discharge between adjacent cathodes and said anode, a plurality of potentiometers; means connecting the end terminals of each of said potentiometers to a respective one of said cathodes and to a reference potential, respectively; and means connecting the contactors of said potentiometers in an output circuit so that the sequential potentials in the output circuit are determined by the settings of the contactors of the individual potentiometers as the discharge is transferred to the associated cathodes.

6. The apparatus of claim 5 further comprising a seismometer, a seismic amplifier having the input thereof connected to said seismometer, means to detonate an explosive charge and generate a first electrical pulse, means responsive to said first electrical pulse to initiate a discharge between the first cathode of said tube and said anode, and means connecting said output circuit to said seismic amplifier to control the gain thereof.

7. The apparatus of claim 5 further comprising a second glow transfer tube having an anode, a plurality of cathodes, and guide electrode means to transfer a discharge between adjacent cathodes and said anode; a plurality of second potentiometers; means connecting the end terminals of each of said second potentiometers to a respective one of said cathodes of said second tube and to said reference potential, respectively; switching means to apply a potential which is positive with respect to said reference potential selectively to one of said anodes; means to apply pulses at a predetermined rate to the guide electrode means of said tubes; means to initiate a discharge between the first cathode of the first-mentioned tube and the anode thereof, said switching means applying said positive potential at such time to the anode of said first-mentioned tube; means responsive to a discharge between the last cathode of said first-mentioned tube and the anode thereof to actuate said switching means to apply said positive potential to the anode of said second tube and to apply a pulse to the first cathode of said second tube to initiate a discharge between said first cathode of said second tube and the anode thereof; and means connecting the contactors of said second potentiometers in said output circuit.

References Cited in the file of this patent

UNITED STATES PATENTS

| | | |
|---|---|---|
| 2,265,538 | Minton | Dec. 9, 1941 |
| 2,696,572 | Schmid | Dec. 7, 1954 |
| 2,702,357 | Townsend | Feb. 15, 1955 |
| 2,794,966 | McCarty | June 4, 1957 |